Figure 1:
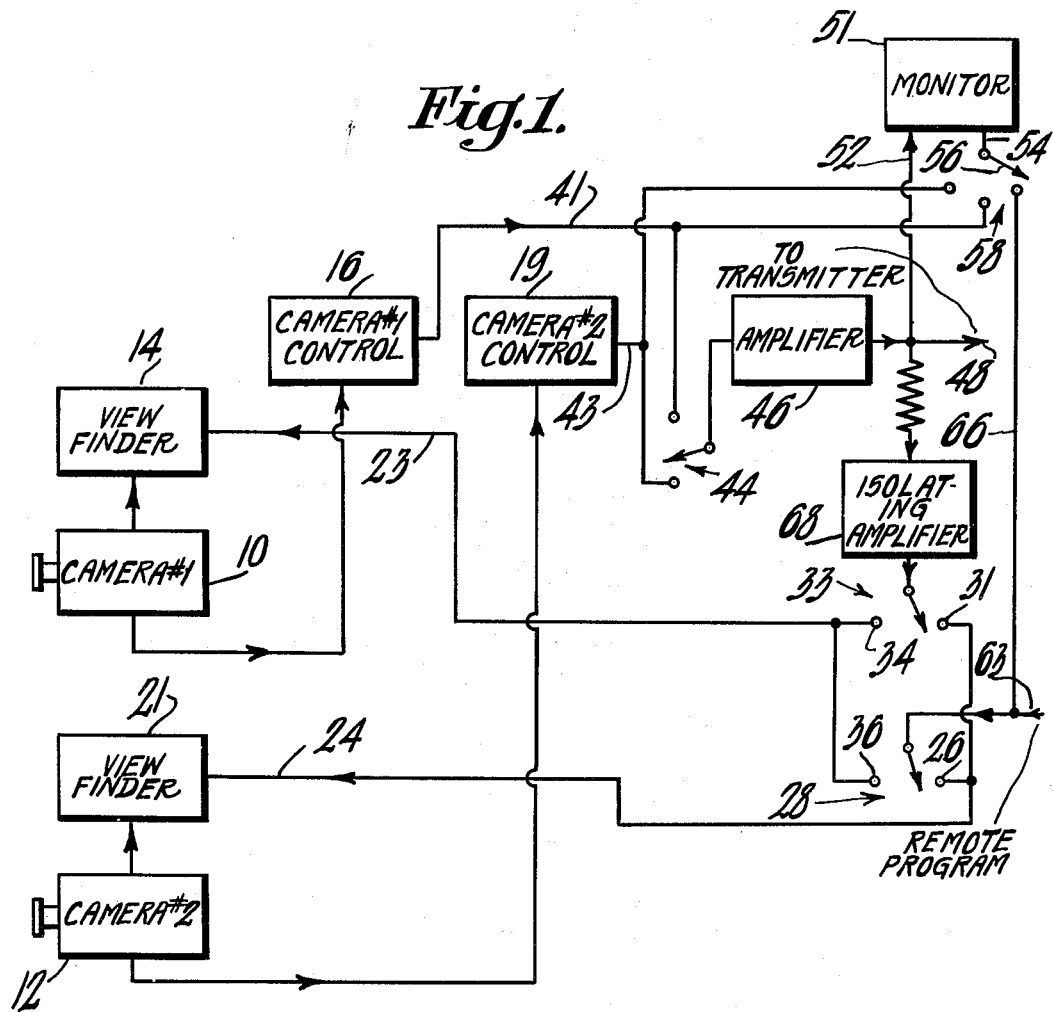

INVENTOR
GEORGE K. GRAHAM
BY
George T. Craig
ATTORNEY

United States Patent Office 2,725,423
Patented Nov. 29, 1955

2,725,423

APPARATUS FOR POSITIONING TELEVISION IMAGES IN MULTIPLE CAMERA SYSTEMS

George K. Graham, Oceanside, N. Y., assignor to Radio Corporation of America, a corporation of Delaware Application February 28, 1951, Serial No. 213,142

3 Claims. (Cl. 178—6.8)

The present invention relates to the positioning of television images when successive television scenes are presented, and more particularly, but not necessarily exclusively, to novel means for facilitating the positioning of images obtained from television cameras and to prevent undesired displacement of scene components during switching operation from scene to scene, lap dissolves, fades and other successive scene presentation techniques; and to provide visual cueing to a camera technician or technicians when required.

In accordance with the invention, each studio or field camera is provided with an electronic view finder, and means are provided to superimpose an image from a different source on the field of view on the view finder which will represent the scene currently being transmitted so that the camera man can so orient his camera that an object in the field of view of the camera will coincide with the same object being televised by another camera. In this manner, the camera technicians see on the view finder screen two images superimposed. One scene is the image presently being transmitted and the other scene is the scene being prepared for transmission by the camera technician. By way of illustration a given camera may be focussed on a building, for example, in the doorway of which a person is framed. This picture would ordinarily be taken with a camera having a short focal lens and would encompass a large scene area, thus establishing locale and perhaps other interesting features surrounding the point of interest. In the assumed example, attention is subsequently to be focussed on the person framed in the doorway. The second camera, in the illustrative example, which is being prepared to take over transmission is focussed so as to show a close up of the person framed in the doorway. The view finder of the second camera, which is being watched by the camera technician, shows, in the usual way, the enlarged image of the person and, if desired, the doorway. In accordance with the invention, the cameraman also sees an image of the entire building and the doorway on his view finder and he can therefore have the enlarged image appear in the same relative position in the total field of view as the smaller image in the scene being transmitted. When switching of one camera to the other occurs, there is no abrupt and confusing change in the position of the person being televised at the point of interest of the scene.

The principal object of this invention is to provide novel means for ensuring that a scene being prepared for transmission by television methods will coincide with a desired or selected portion of the scene which it succeeds.

Another object of the invention is to provide novel means for displaying images to a camera technician superimposed on the image being televised or to be televised by the television camera under his control.

Figure 2:
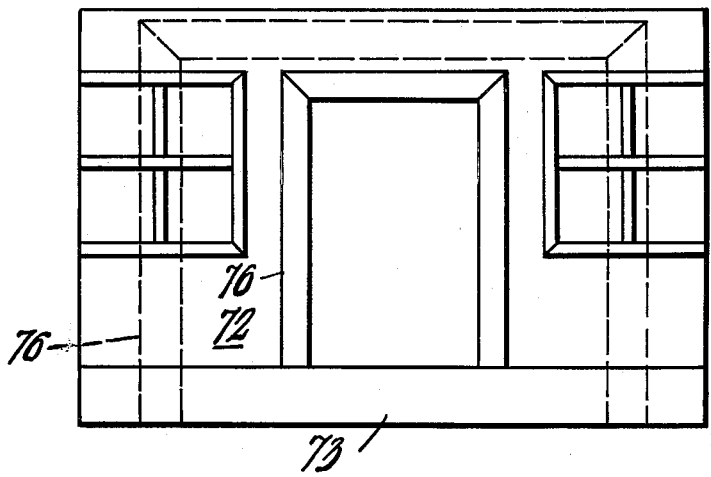

Other objects and advantages of the invention will, of course, become apparent and immediately suggest themselves to those skilled in the art to which the invention is directed from a reading of the following specification in connection with the accompanying drawings in which:

Fig. 1 is a schematic showing of a television transmitting station including studio equipment assembled to embody the invention; and Fig. 2 represents a scene appearing on a television camera view finder or a station monitor illustrating one use to which the invention may be put.

Referring to Fig. 1 of the drawing, there are shown by way of example two television cameras 10 and 12 which may be of any known type used in televising scenes or objects. Television cameras are well known in the art, and it is believed that no further description of each camera is necessary. Camera 10 is provided with an electronic view finder 14 which may be of the kind fully described in Patent No. 2,347,933, granted to R. L. Campbell, May 2, 1944. This view finder includes a cathode ray tube (not shown) which is visible to the camera technician engaged in operating camera 10 to televise a desired scene or object. In normal system operation, this view finder 14 provides an image of the scene being televised by the camera 10. A control console 16, or the like, is provided for controlling the operation of camera #1. Control consoles for television camera operation are by now well known and include necessary and suitable devices for obtaining deflection, blanking, and other necessary functioning of the camera 10.

Camera 12 is also provided with a control console 19. Multiple camera equipment is shown in Patent No. 2,286,540, granted to O. B. Hanson on June 16, 1942. A view finder 21, which is or may be similar to the view finder 14, is associated with the camera 12. This view finder 21 provides an image of the scene being televised by the camera 12.

In accordance with the present invention, means are provided whereby the view finders may obtain operating image signals from sources other than the camera with which the view finder is associated. The image signal supply connections to the view finders 14 and 21 are indicated schematically by lines designated 23 and 24. Line 24 is connected to a contact 26 of a switching device 28. The line 24 is also connected to a contact 31 of a switching device 33. The line 23 is connected to contacts 34 and 36 of switching devices 33 and 28 respectively.

The video signal output from the camera 10 by way of camera control 16 appears in a connection shown schematically as a line 41. The output of the camera 12 by way of the camera control 19 appears in a line 43. A video signal switching device 44 permits selection of signals from either camera to be supplied to a line amplifier 46 and from this line amplifier to a connection designated 48 which represents the output to a radio transmitter or transmission line. An output connection including a line amplifier is shown in Patent No. 2,383,365, granted to G. L. Beers on August 21, 1945.

A monitor 51, which may be of the type described in the Beers patent just referred to, receives video signals from the amplifier 46 over a connection shown schematically as a line 52. An additional video input signal to the monitor is indicated schematically by line 54. The latter is connected to the movable contact 56 of a three-position switch 58 so that video signals from either the camera 10 or the camera 12 may be selected whereby the monitor will exhibit an image corresponding to that being transmitted to the point 48 as well as a signal from either camera 10 or camera 12.

Frequently image signals are received from a remote point for broadcasting. This is indicated schematically in Fig. 1 which shows a line 63 carrying video signals generated at a remote point. These signals may be supplied to the monitor 51 by way of a line 66 and the switch 58 or to either view finder 14 or 21 by way of the switches 33 and 28. The output appearing at the point 48 may be supplied to either view finder 14 or 21 by way of an isolating amplifier 68 and switching device 33.

Fig. 2 of the drawing illustrates one possible use of the system of the present invention wherein a portion of a building 72 constitutes the field of view or scene. The rectangle 73 indicates the outline of the image appearing on one of the view finders or the monitor. The building 72 includes a doorway 76. The picture indicated by the solid lines in Fig. 2 would ordinarily be taken with a short focal length lens and would encompass a large scene establishing locale and other features necessary for dramatic effects for example. The scene represented by the solid lines in Fig. 2 would be followed on the viewing screen of television receivers by a close up of the doorway 76. It will be assumed that an actor is framed in the doorway. In the state of the art prior to the present invention, the positioning of the actor or other figure in the doorway in the second shot or scene selected for transmission would be done on the basis of the camera technician's judgment of position or the camera technician would be directed in his movement by the technical director in order to achieve the desired position. In the system herein described, which embodies the present invention, the camera technician preparing for the second shot would see the two images superimposed and could, if desired, so place the image reproduced by his camera in relation to the image fed to his view finder from the control room or other central point that on switching from the first shot to the second, no undesirable displacement of the image, as observed by the viewer, would occur.

In televising games such as a baseball game, a ball placed in motion is followed by a "long-shot" camera. As it moves through the air in the direction of a player and is caught by him, the operator of the long-shot camera follows the ball in motion, and while this scene is being transmitted, the operator of the "close-up" camera picks up the ball with his camera so that the enlarged view of the ball coincides with the smaller ball from the long-shot camera. On switching from the long-shot camera to the close-up, the ball will retain its relative position on a receiver viewing screen but will appear enlarged.

One possible use of this device would be in the creation of illusions as, for example, by setting two identical chairs against backdrops with camera No. 1 focussed on the empty chair and camera No. 2 focussed on the second chair occupied by a person, using similar focal length lenses and equivalent camera distances. By means of an arrangement embodying the present invention, it would be possible for the camera technicians to superimpose the two images as seen on the view finder so that coincidence is achieved. Under these conditions, a picture from camera No. 1 would show the chair occupied and a switch to camera No. 2 would appear to show the same chair unoccupied and simulate the disappearance of the subject.

In certain dramatic presentations the passage of time is sometimes indicated by the reduction in size of a lighted candle. This effect can be achieved by positioning two similar candle sticks; one with a relatively long lighted candle and the other with a relatively short lighted candle, both placed on identical supports, such as tables, so that the images from these two candles can be made to coincide by the use of a system embodying this invention thereby the scene from one camera will show the long candle and a switch to the second camera will show the smaller candle in the identical position. To aid in distinguishing between the two images as seen in the view finder by the camera technician, the monitor signal fed to each camera view finder or monitor could be modulated in such a way as to present a dot-like structure.

Another use of a system embodying the invention disclosed herein would be in the alignment of several title cards or commercial copy, each having the same wording but being progressively different in size so that the images of the separate cards properly superimposed would produce an illusion of progressive change in size as the picture was switched from one camera to another. In some instances, in order to achieve the desired dramatic effect a studio presentation is integrated with program material originating outside of the studio. As a hypothetical case, a dramatic presentation might include scene from a film of action taken outdoors. For example, a film scene could show two characters walking down a street with a building as a backdrop and either or both of the characters entering the doorway of this building. The remainder of this scene would be presented in the studio and a smooth transition could be accomplished by superimposing the doorway of the studio set on the doorway as shown in the film sequence.

In a system embodying the present invention, the camera technician, in addition to the scene picked up by his camera, can simultaneously view the picture selected by the technical director and he will see the two images superimposed so that it will be possible for the camera technician to act on visual cues picked up by other cameras. In this way, smoothness of operation can be achieved. In Fig. 1, the isolation amplifier 63 is connected to the line indicated schematically at 48 and by means of the switching device 33, the picture being transmitted can be shown on any selected camera where it will appear superimposed on the scene picked up by the particular camera selected. Switching device 28 provides a means for feeding to the selected camera view finder a remote program possibly for cueing purposes or in the case of "split screen" techniques to exhibit to the camera technician the composite split screen picture so that he may position the fraction of the picture with which he is concerned. Switching device 58 provides facilities for selectively viewing the images from any of the cameras as well as the image transmitted by the amplifier 46 on the monitor 51, usually located in the control room, so that the technical director and other program people can view the same image seen by the camera technician in his view finder. Lap dissolves may be accomplished directly by the apparatus of Fig. 1 by providing a potentiometer switching arrangement such as is shown in Goldsmith Patent No. 2,043,997, granted June 16, 1936, in place of the switch 44 of Fig. 1. Cameras 10 and 12 may then be used according to the "lap dissolve" technique and provide signals simultaneously (superimposed) to the amplifier 46 and the connection 48. Then switch 33 may be used to selectively apply the composite signal to the view finder 14 or 21 of either of cameras 10 or 12 respectively.

Since the secondary image appearing in a view finder will be used for positioning purposes only, it need not be a high definition picture and therefore the view finder may be fed through one of the D. C. cables normally feeding the camera. Suitable isolation in the form of resistors or condensers would be required at the two ends of the selected cable.

What is claimed is:

1. A television system wherein image signals are to be provided from a plurality of television cameras and said image signals are to be selected for transmission, a plurality of television cameras, each camera having a separate electronic view finder physically associated therewith, means for feeding an image signal from each camera to its associated view finder, and means for selectively feeding an image signal from one of the cameras to the view finder associated with another of said cameras concurrently with the image signal from said another camera.

2. In a television system, a plurality of television cameras each providing a video output signal, a separate electronic view finder physically associated with each camera, means to feed to each camera view finder the video output signal from its associated camera, a video monitor, means for selecting the video output signal of one of the cameras, means to feed the selected signal to said monitor, and means to feed the selected signal to a selected one of the camera view finders.

3. In a television system a plurality of television cameras each providing a video output signal, a separate electronic camera view finder physically associated with each camera, means to feed the video output signal of each camera to the camera view finder associated therewith, a video monitor, means for selecting the video output signal of one of the cameras, means to feed the selected signal to said monitor, and means to feed the selected signal to a selected one of the camera view finders.

References Cited in the file of this patent
UNITED STATES PATENTS

| | | |
|---|---|---|
| 2,073,370 | Goldsmith | Mar. 9, 1937 |
| 2,113,437 | Batchelor | Apr. 5, 1938 |
| 2,172,936 | Goldsmith | Sept. 12, 1939 |
| 2,306,862 | Brown | Dec. 29, 1942 |
| 2,384,232 | Beers | Sept. 4, 1945 |
| 2,403,628 | Beers | July 9, 1946 |
| 2,525,290 | Edwards | Oct. 10, 1950 |
| 2,526,144 | Lawrence | Oct. 17, 1950 |
| 2,568,166 | Perry | Sept. 18, 1951 |